(12) United States Patent
Dunham

(10) Patent No.: US 6,529,927 B1
(45) Date of Patent: Mar. 4, 2003

(54) LOGARITHMIC COMPRESSION METHODS FOR SPECTRAL DATA

(75) Inventor: Mark E. Dunham, Los Alamos, NM (US)

(73) Assignee: The Regents of the University of California, Los Alamos, NM (US)

(*) Notice: Subject to any disclaimer, the term of this patent is extended or adjusted under 35 U.S.C. 154(b) by 0 days.

(21) Appl. No.: 09/540,115

(22) Filed: Mar. 31, 2000

(51) Int. Cl.⁷ .............................................. G06F 17/14
(52) U.S. Cl. ...................................................... 708/400
(58) Field of Search ................................. 708/400–410

(56) References Cited

U.S. PATENT DOCUMENTS

| | | | | |
|---|---|---|---|---|
| 5,495,554 A | * | 2/1996 | Edwards et al. | 704/205 |
| 6,353,686 B1 | * | 3/2002 | Daly et al. | 382/251 |
| 6,424,725 B1 | * | 7/2002 | Rhoads et al. | 382/100 |

OTHER PUBLICATIONS

Lundquuist et al., "A Homomorphic Approach to Companding," 28th Asilomar Cong. On Signals, Systems and Computers, Nov. 1994.

Graham, "Discrete Gabor Analysis," LA–UR 98–3509, 1998.

* cited by examiner

Primary Examiner—Tan V. Mai
(74) Attorney, Agent, or Firm—Ray G. Wilson

(57) ABSTRACT

A method is provided for logarithmic compression, transmission, and expansion of spectral data. A log Gabor transformation is made of incoming time series data to output spectral phase and logarithmic magnitude values. The output phase and logarithmic magnitude values are compressed by selecting only magnitude values above a selected threshold and corresponding phase values to transmit compressed phase and logarithmic magnitude values. A reverse log Gabor transformation is then performed on the transmitted phase and logarithmic magnitude values to output transmitted time series data to a user.

6 Claims, 3 Drawing Sheets

LOGARITHMIC COMPRESSION METHODS FOR SPECTRAL DATA

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to data compression and expansion, and, more particularly, to the application of Gabor and logarithmic transforms to data compression and expansion.

BACKGROUND OF THE INVENTION

Modern communications have a need to transmit increasingly large amounts of data through transmission channels that are constrained in time and frequency range. The general term for this problem is data compression and expansion, or "companding." Algorithms and hardware that deal with companding must address the properties of images, audio, data, and RF communication signals. The present invention deals with a "lossy" companding algorithm, which is suited to the transmission of images, audio, and RF signals, but not to binary computer data, where a lossy scheme can result in an unacceptable high bit error rate.

Sensor derived data often divides into two classes: those that provide constant absolute precision regardless of input level, and those where the desired data is actually a modulation of an underlying brightness, generating a constant relative precision. Most images are high frequency contrast modulations of an underlying scene brightness, where the contrast modulation remains much smaller than the total brightness range seen over the entire observation time. Similarly, most RF signals are intentionally modulated as the mathematical product of the information and an underlying carrier, whose brightness can vary dramatically upon reception. Therefore, the great majority of practical sensor applications are multiplicative modulation processes, and only require constant relative precision. This, in turn, implies that either floating point or logarithmic representations may be used without loss of resolution, as long as they are properly scaled.

The concept of applying such a logarithmic transform to a complex spectrum is well known, and is known as a homomorphic process. But most of the reported work is directed to the separation of multiplicatively combined signals, or echo removal, and not to compression of a signal. The basic homomorphic process consists of applying a logarithmic transform to the output of a Fourier transform in the forward direction, and inverting this sequence in the reverse direction, after suitable manipulations in the log Gabor domain. The purposes of the Fourier transform are to convert convolution processes to multiplications in frequency space, and to separate various signals that overlap in the time series, but which are separate in the frequency space. The log transform then allows the multiplicative signals still contained in each frequency sample to be treated as additive superposition. This process has not been suggested for use in companding operations.

Digital voice grade channels are commonly companded in commercial telephony to compress 12 bits of inherent dynamic range to an 8 bit format. These schemes are driven by a need for low complexity and cost, and take advantage of the characteristics of audio reception by a human ear. The formal systems that implement audio log compression are known as the Mu Law under a system developed by Bell Telephone or the A Law under CCIR in Europe. Each of these systems has the same basic characteristics:

a. Linear behavior for signal levels near zero.
  b. Log behavior above a corner value, to a maximum input value set by the input digitizer.

An important liability of these pure logarithmic companding schemes is that they are performed on the raw time series, generating intermodulation products between all frequencies in the band. Some of these products fall out of band in the compressed channel, and are lost or are aliased down to new frequencies. In other words, the homomorphic process is not used and the absence of a Fourier Transform leaves multiple superposed signals to be log transformed together, resulting in destruction of the smaller signals in favor of the large signals. Even though this limitation is present, logarithmic companding is the rule for single digital voice grade channels, and relies on the fact that these channels are not designed to carry more than one speaker on each end of a telephone link.

One prior scheme (Lundquist et al., A Homomorphic Approach to Companding, $28^{th}$ Asilomar Conf. on Signals, Systems and Computers (Nov. 1994)) combines companding and homomorphic processing to provide a compression/expansion process with homomorphic processes nested inside the companding. That is, a signal is compressed using an Mu/A law compressor and then subjected to Fourier and log transforms and then expanded by performing an inverse Fourier and log transform followed by a Mu/A law expansion.

But this process still provides for log compression before any Fourier transform has occurred so that the signal components will have the same mixing and suppression problems as the standard Mu/A Law systems. Further, the process now involves logarithms of logarithmic data, which is a very lossy process compared to a single logarithmic transformation. According to Lundquist, the addition of a complex homomorphic process does little to enhance the basic Mu/A Law performance.

In accordance with the present invention, a new homomorphic process is provided that enhances the basic Mu/A Law performance of a logarithmic companding system.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a method for logarithmic compression of time series data. A log Gabor transformation is made of incoming time series data to output phase and logarithmic magnitude spectrum values. The output phase and logarithmic magnitude spectrum values are compressed by selecting only magnitude values above a selected threshold and corresponding phase values to transmit as compressed phase and logarithmic magnitude spectrum values. The transmitted values are expanded and a reverse log Gabor transformation is then performed on the transmitted phase and logarithmic magnitude spectrum values to output transmitted time series data to a user.

In a particular aspect of the present invention, the log Gabor transformation is performed by forming a Fourier transform of input time data to output spectral data as frequency domain data, and then transforming the spectral data in frequency domain format to polar coordinate format having magnitude and phase information. The magnitude information is finally transformed to a logarithmic format to output an output logarithmic magnitude value and a phase value.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

In accordance with the present invention, a signal image compression and expansion scheme is developed that is not tied to Mu/A Law principles. A general signal decomposition method, log Gabor Analysis, allows arbitrarily complex signal mixtures to be manipulated with only addition and subtraction processes to perform all important operations on the data and enables significant compandor performance improvements.

Figure 1:
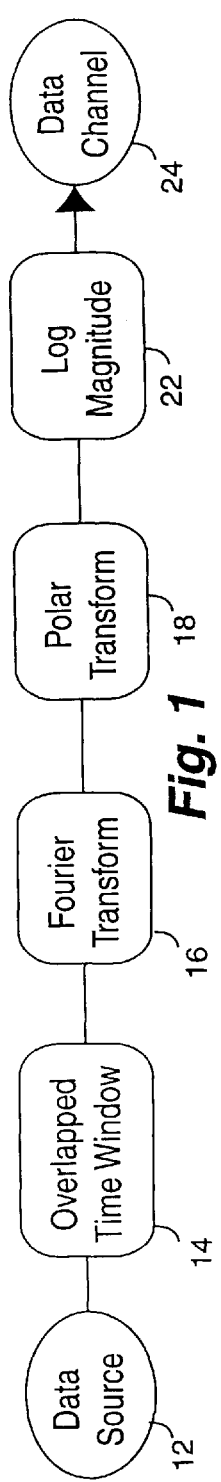
FIG. 1 is a block diagram of a log Gabor process according to the present invention.

First, consider a conventional Gabor Transform scheme, where spectral data output from a Fast Fourier Transform (FFT) is the primary internal data exchange medium. The basic log Gabor homomorphic. process according to one embodiment of the present invention is shown in FIG. 1. Each step in this process is required in order to achieve proper compandor system function. Data are read in from a source 12, into a sliding time window 14. Window 14 is typically a monotonic curve such as a Gaussian or Hanning function, which reduces to value zero at each end of a data block of length N. Each new data block is read in, and the window is multiplied onto the data vector. A key feature is that some portion of the end of the last data block is included in the next data block, which is known as overlap of length K. The window function is preferably designed with a particular overlap factor K, which will range from 0.25<K/N<0.75 in allowed value. The quantity 1+K/N is the oversampling ratio, and determines the amount of redundancy in the data stream, and hence the robustness of the transform. Details on how to construct proper Gabor windows and the consequent robust reconstruction are presented in Graham, "Discrete Gabor Analysis", LA-UR 98-3509, 1998, available from Los Alamos National Laboratory.

A standard Discrete Fourier Transform (DFT) of length N is applied 16 to the windowed data. Usually this will be a Fast Fourier Transform (FFT) for efficiency reasons, but the type of DFT is not critical to the process.

There are several reasons for transforming to a complex spectral representation with the preferred Gabor process, including:

a. Man-made RF signals are normally designed in the frequency domain, with a narrow carrier frequency spread by a finite width modulation. Also, natural signals, ranging from NMR to machinery to radio astronomy, and the like, are often characterized by strong tones at discrete frequencies embedded in large amounts of uncorrelated background noise or interference. Filtering by frequency separation to remove unwanted noise and interference is a very basic sensor data processing operation.

b. The primary mathematical motivation for using Fourier techniques is to convert the numerically intensive convolution operator to a simple vector product in the frequency domain. Not only is convolution the underlying linear model for all system response function theory, but it is also is the basis for many modulation operations. The ability to perform convolutions as vector products is the most common reason for using Fourier techniques in advanced signal processing.

Figure 3:
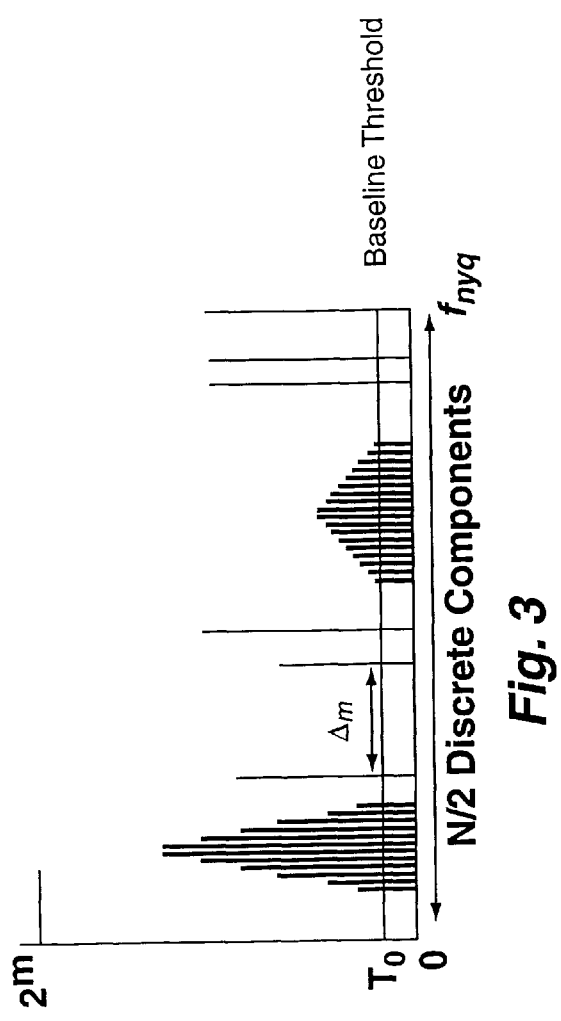
FIG. 3 graphically depicts a spectral decomposition of signal data after application of a log Gabor process and the function of the threshold vector operator.

Although real and imaginary components of each spectral channel are the normal output of an FFT, it is preferable in an information context to transmit magnitude and phase. Mathematically such a transformation converts Cartesian coordinate descriptions to a Polar form, using radius for magnitude and angle for phase as the description of a single signal sample. An important part of the preferred log Gabor process is to move from real and imaginary DFT output format to a magnitude and phase format after FFT process 16. This process is known as a polar coordinate transformation 18. In the process, the negative frequencies are discarded since the time input is real, leaving pairs of magnitude and phase values for N/2 frequencies after this step, as shown in FIG. 3.

The magnitude values only are now transformed 22 to a Logarithmic scale, which may be any convenient base. Typical bases would be Base 10, so that decibel values are obtained directly, or Natural Log base in order to facilitate further computation. As a general rule, the Log base should be chosen to maximize the input dynamic range, which can be represented in a finite precision output of R bits.

There is no loss in using either Cartesian or Polar format, and the operation is transparent from an internal accuracy point of view. The preference for a polar format is based in the physics of signals and images, so that magnitude may be processed with dramatically different models than phase.

In summary, the FFT provides a useful simplification in the mathematics of convolution. The Polar format simplifies cascade processes to an addition of phase terms without alleviating the requirement for products in the magnitude terms. The final element of the pre-processor is logarithmic transformation 22 of the magnitudes in the Polar format, which now allows simple addition of both magnitude and phases to create a convolution.

This multistep log Gabor process for two convoluted signals $S_1(t)$ and $S_2(t)$ can be represented as $$S_1(t) \otimes S_2(t) \xrightarrow{\text{FFT}}$$

$$S_1(f)S_2(f) \xrightarrow{\text{Polar}} |S_1||S_2|(\angle_1 + \angle_2) \xrightarrow{\text{Log}} (\text{Log}|S_1| + \text{Log}|S_2|)(\angle_1 + \angle_2)$$

The cross symbol is standard for convolution in engineering, while it is recognized in process step 22 that the log transform has only been applied to the magnitudes, while the phases have been unmodified. This three-step transform is precisely a log homomorphic process with the improvement that no complex logarithm is required, as would be required by prior art processes.

Figure 2:
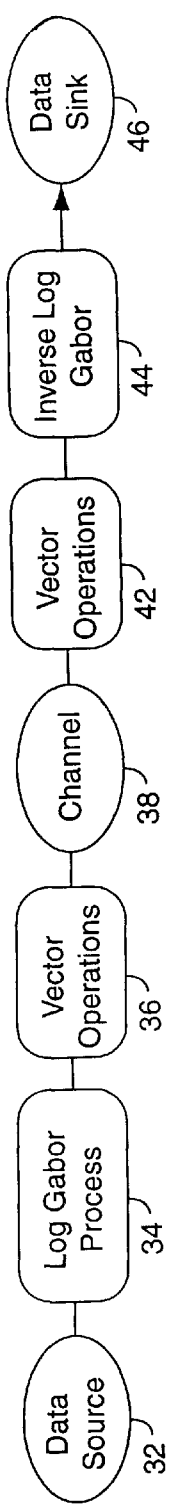
FIG. 2 is a block diagram of a companding process using the log Gabor process shown in FIG. 1.

FIG. 2 illustrates how the log Gabor Process shown in FIG. 1 may be employed in a complete process to accomplish high fidelity compression of image and signal data. Data from a source 32 is input to the log Gabor Processor 34, and output to compandor vector operations 36. Gabor spectral decomposition is the basis of the Companding algorithm, where various signals are sorted by their frequency components. Spectral decomposition also provides integration or processing gain on each coherent signal, so that a signal is sharply differentiated from the noisy background. These are essential features that make the compression process far easier.

The companded data is transmitted over a channel 38 for input to vector inverse companding operations 42 and then to inverse log Gabor Processor 44. The reconstituted data are output to data "sink" 46, the user of the data. Vector operations 36, 42, shown in FIG. 2 and further described below, define lossy compression and expansion methods which retain more useful signal information than previous companding processes, since it is embedded inside a log Gabor transform.

Figure 4:
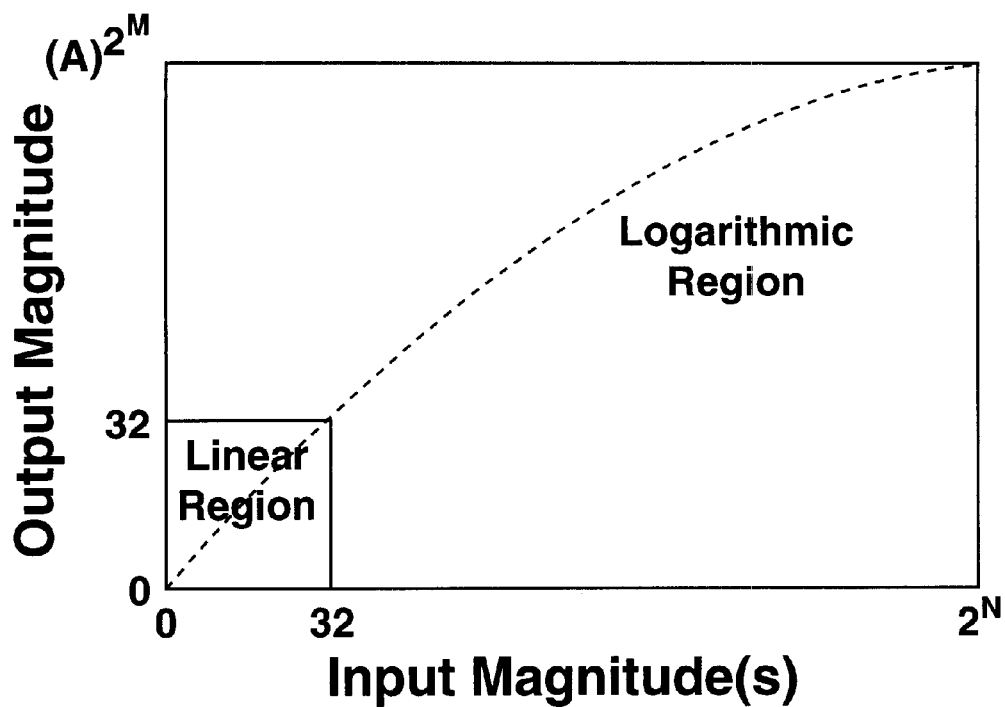
FIG. 4 graphically illustrates the magnitude transfer function of the process.

The vector operators are described below with reference to FIGS. 3, 4, and 5. FIG. 3 graphically depicts the results of the vector operations. Here, N/2 magnitudes from the log Gabor process of FIG. 1 are shown after a non-linear threshold process has been applied by a first vector operator. In FIG. 3, $f_{NYQ}$ is the log Gabor defined maximum Nyquist frequency for the input data; $\Delta_m$ is the spectral separation of wideband components to which compression may be applied; $T_0$ is the compression operator threshold value; and $2^M$ represents an input dynamic range expressed as M bits of resolution.

A first vector operator applies a threshold value $T_0$ to arbitrarily force all magnitudes below that value at input to value zero at output. While this simple rule has been shown to produce good results on many data, it is also specifically noted here that other operators might be used, e.g., variable thresholds may also be employed, which retain all magnitudes within a certain distance from a larger peak magnitude, or which apply fixed pattern filters that are designed with a priori knowledge of spectral patterns to be expected in the data.

The next vector operator is the log magnitude portion of the log Gabor process. FIG. 4 shows that the magnitude transfer function for retained components is linear with unity gain below a turnover point, and then converts to a log process above that point. As discussed herein, a preferred turnover value is 32. The linear process near zero is natural and required since the log function goes to infinity at zero. Above the turnover point, the log process maintains a constant fractional step size where each least significant bit (LSB) is a constant fraction increase over the last. With a base of A=1.07 as shown, the constant fraction is 7%, representing approximately ½ dB per bit performance, which matches well the precision of real world sensors.

Figure 5:
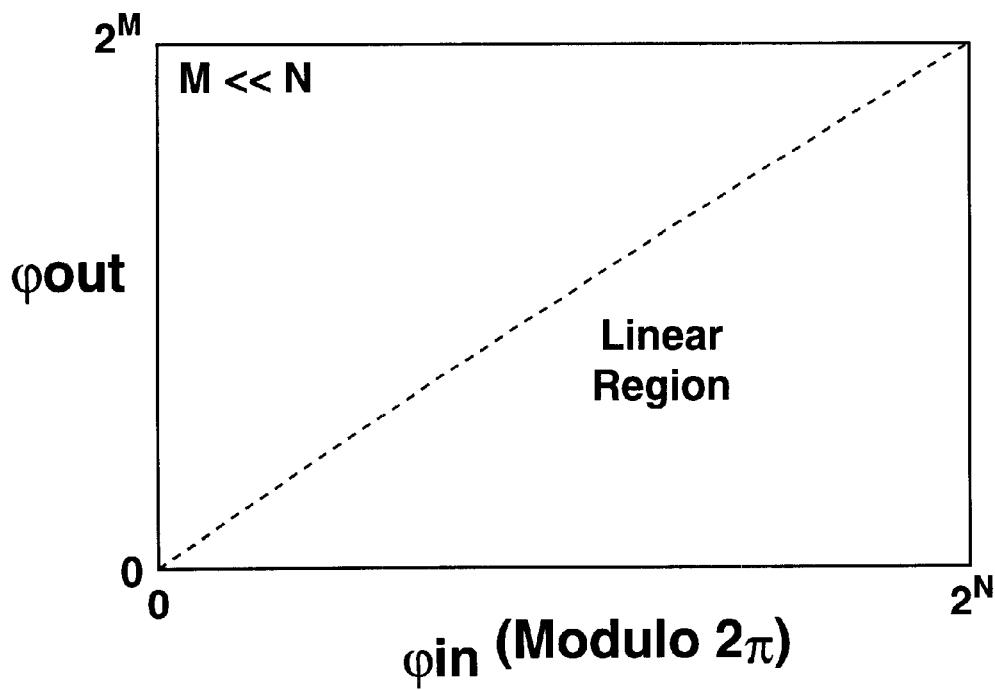
FIG. 5 graphically illustrates the phase transfer function of the process.

Yet another vector operation is a phase spectrum operation, shown in FIG. 5. This operator assumes that phase is uniformly distributed in occurrence for no a priori signal knowledge, and therefore no special transform is justified. Instead, once phase has been extracted in the Polar conversion, the precision is rounded to no more that 9 bits, or 0.7 degrees RMS. This precision is also better than almost every real world sensor can maintain and the phase precision can be traded with magnitude precisions to as little as 7 bits or 3 degrees when it is not as important as precision magnitude. In most phase shift key communication applications, phase steps of at least 45 degrees are used, and 4-bit phase precision is adequate.

Figure 6:
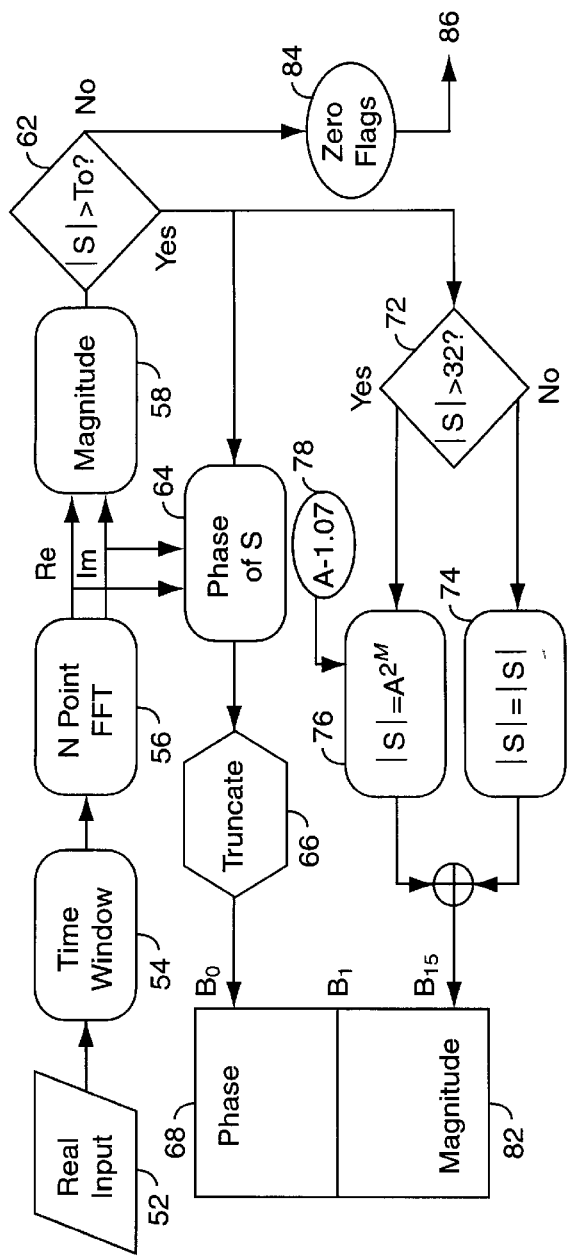
FIG. 6 is a flow diagram of a process for generating phase and magnitude components for an input above a threshold value.

FIG. 6 show the steps required to calculate the algorithm output for spectrum components of a real input 52 above a threshold $T_0$.(FIG 3). In particular, a time window 54, FFT 56, Polar conversion 58, 64, linear magnitude conversion 74 at small amplitude 72, and log magnitude conversion 76 for large amplitudes 76 are shown. This block diagram is oriented around a 16 bit output format, which is desirable for most practical applications. However, there is no restriction on the number of output bits, and more or less output bits would imply a different crossover value 72 from linear to log. In this exemplary system, 32 is approximately the crossover point 72 where the log base equals the linear percent change 78 for each new LSB of increase. Note that $T_0$ is the threshold below which all spectrum data will be thrown away 62, or set to zero 84. Also note that the Log base M can also be set arbitrarily, depending on how much input dynamic range must be spanned by the fixed number of output magnitude bits. It is also possible to trade the number of magnitude bits 82 ($B_{15}$–$B_1$) and phase bits 68 ($B_1$), since various signals can require more or less phase and magnitude precision.

The process shown in FIG. 7 assumes that a determination is made 62 that the magnitude |S| is below compression threshold $T_0$, and, therefore, will be suppressed. In that case, the magnitude and phase are assumed to be 0, and this normally occurs in sequences known as runs 86. For a sparse spectrum, the runs 86 may be hundreds of frequency samples long, and it is therefore efficient to count them 88 and transmit only the run length to represent all the zeros as one number 98. Here is where the compression gain of the algorithm is achieved using the variable threshold, which can be varied by a system operator to control the number of suppressed spectral components.

The run-length words 92, 96 are the same size as the retained data words, e.g., 16 bits, so they must be identified. While other standard compandors use embedded header blocks to describe run lengths, the process herein seeks to minimize output overhead in order to maximize performance for short run lengths. By reserving pattern 1111 in the most significant bits (MSBs), run-length words are identified 94 uniquely while only losing 32 levels out of 9 magnitude bits, or 128 levels out of 8 magnitude bits. This simple scheme allows a complete coded wave form to be transmitted in a strict 16 bit format, which is a natural boundary in digital word size and well matched to the needs of practical sensors.

Figure 7:
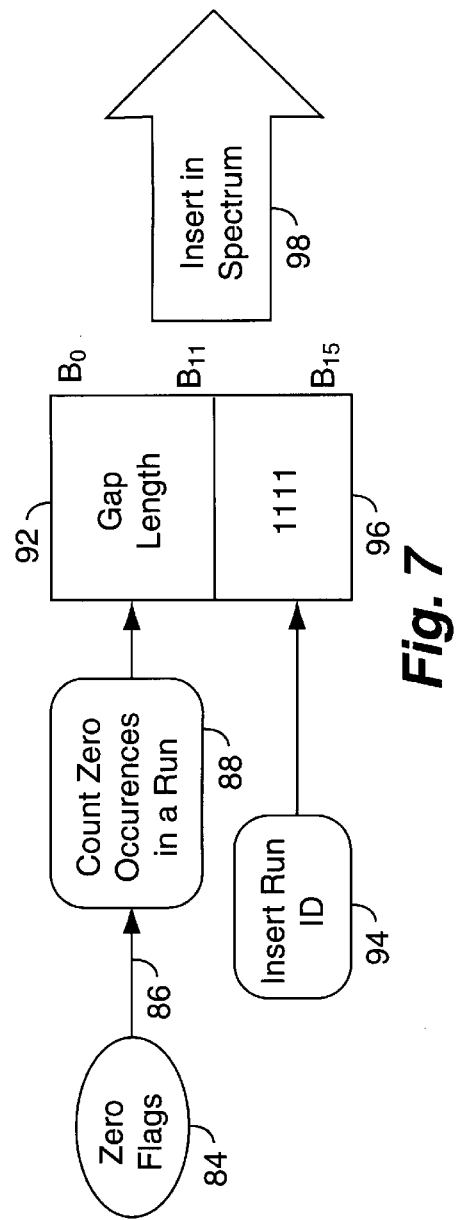
FIG. 7 is a flow diagram of a process for generating compressed spectrum data when the magnitude of the spectrum is below a threshold value.

Expansion of the compressed signal output from the process shown in FIG. 6 is simply the insertion of zero values for magnitude and phase in the gap length defined through the process shown in FIG. 7. Magnitude values are expanded as linear or logarithmic values (FIGS. 4 and 5) and the composite phase and magnitude values are input to a reverse Gabor transform.

In accordance with the present invention shown in FIGS. 1–7, a compression operation has been applied to the homormorphic data output from the log Gabor processor. There are two principal parameters that control the compression process: magnitude of the level threshold $T_0$, and the size of the FFT block length N. Methods of defining $T_0$ can be adaptive or fixed. In general, $T_0$ should be set one standard deviation or more above the random noise floor of a channel. However, too high a value for $T_0$ will discard spectrum information of value in rapidly changing regions. A good compromise is to use a noise-riding threshold, which maintains a fixed offset above the measured noise level of the channel spectrum.

N is dependent on the type of data that is being companded. If any significant periodicity is known a priori in the data, then N should be set just larger than that periodicity. If the data appear continuous, then N should be set to be approximately 100/B, where B is the −10 dB width of the spectra for the dominant component of the data, as shown in FIG. 3. Larger N values will allow for larger compression ratios since more spectral components will be available to suppress. Values of 1024<N<32768 are exemplary and have been used.

This compandor system avoids suppression of additive signal components, while gaining the benefits of constant relative precision that a logarithmic transform affords. The result is a compandor system that leverages the common properties of images and signals, and that can be run at a wide variety of compression ratios, depending on tolerable degradation of the information.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for logarithmic compression of time series, comprising the steps of:

performing a log Gabor transformation of incoming time series data to output phase and logarithmic magnitude spectrum values;

compressing the output phase and logarithmic magnitude spectrum values by selecting only magnitude values above a selected threshold and corresponding phase values to form compressed phase and logarithmic magnitude spectrum values;

transmitting the compressed, phase and logarithmic magnitude spectrum values;

receiving and expanding the compressed phase and logarithmic magnitude spectrum values; and performing a reverse log Gabor transformation on the transmitted phase and logarithmic magnitude spectrum values to output transmitted time series data to a user.

2. A method according to claim 1, where the log Gabor transformation comprises the steps of:

forming a Fourier transform of the incoming time series data to output spectral data in frequency domain format;

transforming the spectral data in frequency domain format to polar coordinate format having magnitude and phase information; and converting the magnitude information to a logarithmic value to output the phase and logarithmic magnitude spectrum values.

3. A method according to claim 2, where compressing the output phase and logarithmic magnitude spectrum values comprises the steps of:

comparing the logarithmic magnitude value to a threshold value to define a run sequence; and categorizing the run sequence as a length of record to represent a compressed value for the run sequence.

4. A method according to claim 3, further including the step of identifying each run sequence by a common identifying bit pattern.

5. A method according to claim 1, where compressing the output phase and logarithmic magnitude spectrum values comprises the steps of:

comparing the logarithmic magnitude spectrum values to a threshold value to define a run sequence; and categorizing the run sequence as a length of record to represent a compressed value for the run sequence.

6. A method according to claim 5, further including the step of identifying each run sequence by a common identifying bit pattern.

* * * * *